United States Patent [19]

Stewart et al.

[11] 4,048,353

[45] Sept. 13, 1977

[54] METHOD OF DRILLING AND INJECTING PERSERVATIVE FLUID INTO RAILWAY TIES

[75] Inventors: John Kenneth Stewart; Helmuth von Beckmann, both of Columbia, S.C.

[73] Assignee: Canron, Inc., New York, N.Y.

[21] Appl. No.: 667,993

[22] Filed: Mar. 18, 1976

[51] Int. Cl.² .......................... B23B 35/00; B27K 3/02

[52] U.S. Cl. .......................................... 427/291; 21/7; 21/73; 118/35; 144/327; 408/1 R; 408/59

[58] Field of Search ...................... 408/59, 1; 144/317, 144/324, 327; 118/35; 427/291; 21/7, 72, 73

[56] References Cited

U.S. PATENT DOCUMENTS

| | | | |
|---|---|---|---|
| 2,708,852 | 5/1955 | Wohlfahrt | 408/59 |
| 3,450,073 | 6/1969 | Baker | 21/73 X |
| 3,767,315 | 10/1973 | Burks | 408/59 |

FOREIGN PATENT DOCUMENTS

| | | | |
|---|---|---|---|
| 174,472 | 4/1953 | Austria | 21/73 |
| 144,925 | 1/1931 | Switzerland | 21/73 |

*Primary Examiner*—Othell M. Simpson
*Assistant Examiner*—Z. R. Bilinsky
*Attorney, Agent, or Firm*—Wenderoth, Lind & Ponack

[57] ABSTRACT

Holes in railway ties are drilled and impregnated with creosote or other preservative using a hollow drill with consecutive drilling and creosote injection cycles, either at the time of rail mounting or in a prior processing stage so as to produce a tie with improved resistance to deterioration, for example due to ingress of water in the tie hole. The invention enables the preservation of pretreated ties, which are subsequently drilled to receive spikes for rail tie plates, by continuing the skin of creosote or other preservative from the outer surface of the tie to the walls of the drilled hole. A sealing collar assembly is mounted on the drill to prevent egress of preservative from the hole during the injection process.

1 Claim, 11 Drawing Figures

METHOD OF DRILLING AND INJECTING PERSERVATIVE FLUID INTO RAILWAY TIES

BACKGROUND OF THE INVENTION

This invention relates to a method for drilling and injecting preservative, suitable for use with railway ties to provide improved resistance to deterioration.

In the known processes for handling railway ties the preservation and drilling steps are usually separate. Specifically, a tie which has been previously treated by spraying, painting or dipping in creosote or other preservative is subsequently drilled to receive a spike for locating a rail tie plate. This drilling step exposes the interior core of the tie to the ingress of water, which undermines the effectiveness of the outer preserving skin of creosote or other preservative which has previously been applied and such ingress of water results in deterioration of the tie. It is difficult to apply creosote or other preservative manually or otherwise to the drilled hole in the tie and in any event such a step would seriously impede the rate of track laying.

SUMMARY OF THE INVENTION

It is an object of the present invention to achieve a railway tie with improved resistance to deterioration by virtue of an improved barrier layer of preservative such as creosote and specifically is an object to achieve a method of applying a preservative such as creosote to a hole drilled in a railway tie.

According to an aspect of the invention there is provided a method of drilling and injecting preservative fluid, suitable for use with a railway tie, the method comprising the steps of initially drilling the hole with a suitable fluted drill of the kind incorporating an internal, longitudinal fluid flow passage opening adjacent the drill tip, by rotating the drill in the drilling direction and simultaneously axially feeding the drill into the drilled hole, reversing the direction of drill rotation and simultaneously withdrawing the drill to clear the drilled hole of shavings, returning the drill to the hole using drilling rotation, reversing the drill rotation and maintaining the drill fully in the hole, while injecting preservative fluid into the walls of the hole from said opening, sealing the mouth of the hole to prevent the egress of preservative therefrom, and subsequently withdrawing the drill from the hole.

Rotating of the drill during preservative injection imparts a centrifugal action to the preservative fluid with assists in penetration of the hole walls.

Such a method of drilling and injecting preservative ensures that the drilled hole is fully protected against the ingress of moisture into the core of the tie since any outer skin of preservative originally applied to the tie is continuous with the preservative applied to the walls of the drilled hole.

BRIEF DESCRIPTION OF THE DRAWINGS

There now follows a description of some embodiments of the invention by way of example only with reference to the accompanying drawings in which.

DESCRIPTION OF PREFERRED EMBODIMENTS

Figure 1:
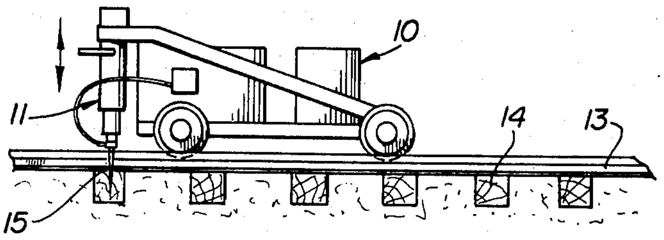
FIG. 1 shows schematically a tie drilling and lubricating apparatus for running along a track and drilling the ties in situ.

Referring to the drawings, a tie drilling apparatus generally indicated by reference 10, is mounted for running along the rails 13 of a track and drilling the ties 14 of the track to receive a spike for locating a rail tie plate in the well known manner. The apparatus includes a rotating and feeding and retracting device 11 for the tie drill 15 as well as a device for feeding preservatives such as creosote to the drill. The apparatus for rotating feeding and retracting the drill will not be described in detail as suitable mechanisms are well known in the art. The invention is particularly concerned with the manner of feeding lubricant to the drill and ensuring a seal during the injection of preservative into the drilled hole and to the associated drilled construction and method steps in a drilling and injecting process.

Figure 2:
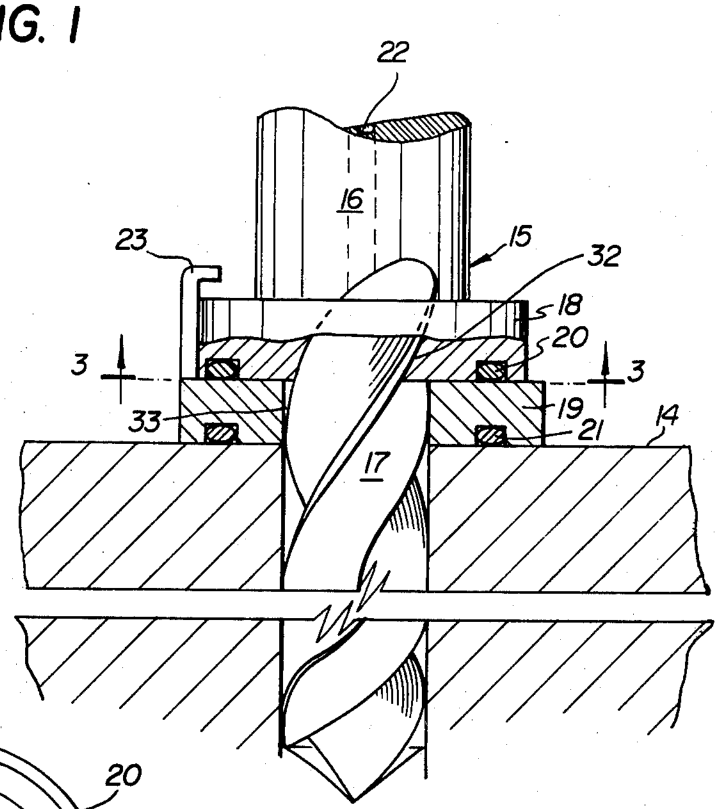
FIG. 2 shows a detailed sectional view of the drilling operation.

Referring to FIG. 2, the drill assembly, aenerally indicated by reference 15 in FIGS. 1 and 2, comprises a fluted shank 17 with a fluid flow passage 22 extending along the axial length thereof and emerging at a point (not shown) adjacent the tip. The passage 22 extends through an upper driving collar 16 which is also used to receive preservative from an unshown source. The apparatus and manner of supplying fluid to a rotating drill is well known in the art, for example in feeding lubricant to hollow drills, and will not be described in detail.

Around the fluted shank 17 and beneath the collar 16 are arranged an upper sealing collar 18 and a lower sealing collar 19. The latter includes an O-ring seal 21 located in an annular groove in the lower surface thereof and which is of relatively soft material to provide an effective seal against the relatively rough upper surface of a tie 14. The upper sealing collar 18 similarly includes an O-ring seal 20 in an annular groove in the lower surface thereof, but this is of a harder nature than the O-ring seal 21, because the lower surface of the seal 20 engages the relatively smooth upper surface of the sealing collar 19.

Figure 3:
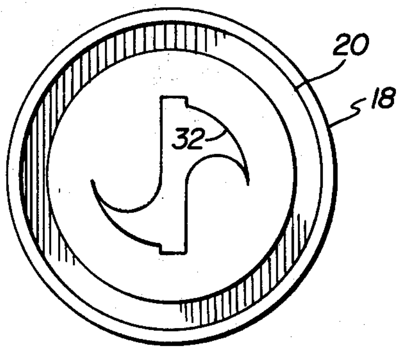
FIG. 3 shows an end view of the drill and sealing collar used in the apparatus of FIGS. 1 and 2.

The upper sealing collar 18 has a fluted bore 32, shown more clearly in FIG. 3, which mates with the fluted drill shank 17 and allows the sealing collar 18 to rotate with the drill and yet move axially with respect thereto by relative rotation. Limited relative axial movement between the sealing collars 18 and 19 is permitted, but is limited by the lugs 23, seen more clearly in FIG. 4, on the lower sealing collar 19.

Figure 4:
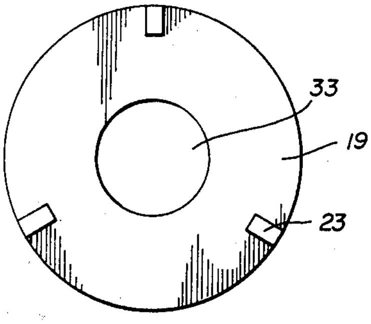
FIG. 4 shows an upper plan view of the sealing collar shown in FIGS. 2 and 3.

The sealing collar 19 has a cylindrical bore 33, seen more clearly in FIG. 4, corresponding to the external overall diameter of the drill shank 17, and thus the sealing collar 19 is independent of the rotation of the drill assembly 15.

Means (not shown) are provided for effecting axial movement of the drill during its rotation. Means are also provided for urging the sealing collar assembly into sealing engagement with the tie 14 and two alternative such means are shown in FIGS. 6 and 7.

Figure 6:
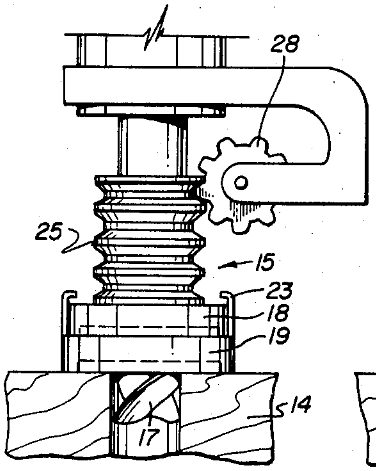
FIG. 6 shows one means for sealing the drill in the apparatus of FIGS. 1 through 5*e*.

In FIG. 6, the drill freely supports a rotating gear rack 25 which is rotatably fast with the upper sealing collar 18 and meshes with a pinion 28 mounted on a movable support arm transversely of the drill. As the drill is rotated, engagement of the pinion 28 with the gear rack 25 will result in axial movement of the collar 18, and with it the collar 19, in a direction dependent upon the 'hand' of rotation of the pinion 26.

Figure 7:
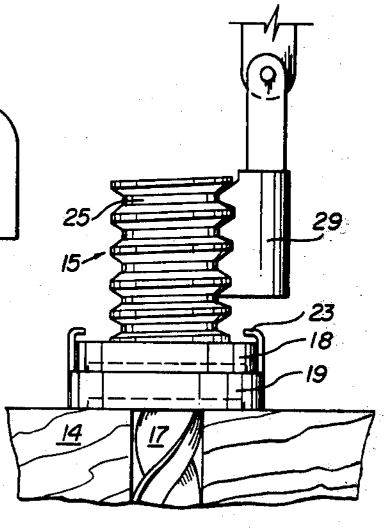
FIG. 7 shows an alternative means for sealing the drill to that shown in FIG. 6.

In place of the pinion 28 a rack 29, as shown in FIG. 7, may be provided for effecting the axial movement of the collar assembly.

It will be seen that with the arrangements of FIGS. 6 and 7 no independent drive means is required for moving the collar assembly axially.

The cycle of drilling and preservative injection is generally as follows:

Referring to FIG. 5, the drill assembly 15 is rotated in the drilling direction so that the drill shank 17 penetrates the tie 14 from the upper surface thereof. When the desired depth hole has been drilled, the rotation of the drill is reversed and the drill is retracted as shown in FIG. **5*b*. During this initial hole drilling arrangement the collars 18 and 19 shown in FIG. 2 are not utilized. The drill reversal and retraction step shown in FIG. 5*b* clears the shavings 30 produced by the drilling operation from the drilled hole and the tie 14**.

Figure 5A:
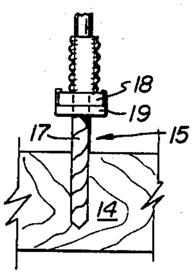
FIGS. 5*a*, 5*b*, 5*c*, 5*d* and 5*e* show successive stages in the drilling operation of the apparatus shown in FIGS. 1 through 4.
Figure 5B:
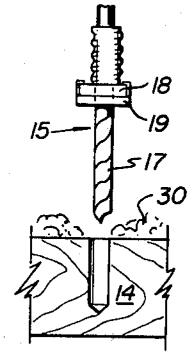
Figure 5C:
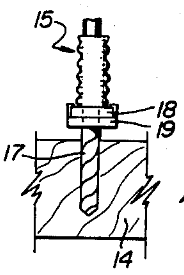
Figure 5D:
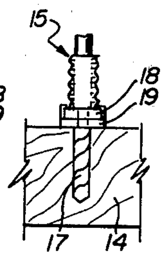
Figure 5E:
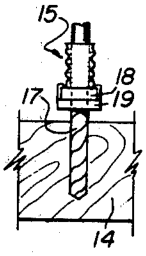

The drill assembly 15 is then reintroduced into the drilled hole while rotating in the drilling direction to facilitate entry, as shown in FIG. **5*c*. Drilling continues and the collar drive arrangement is engaged to bring the collar assembly into sealing abutment with the upper surface of the drilled hole, whereupon preservative, such as creosote, is injected through the upper collar 16 along the drill passage 22 and out from the unshown exit point to the hole. The centrifugal action associated with drill rotation promotes the emergence of the preservative from the drill and into the walls of the hole. The collar assembly prevents the egress of preservatives at the mouth of the hole. Drill rotation may be reversed during this injection phase shown in FIG. 5*d* to achieve this centrifugal action without retraction of the drill. At the end of this injection phase the collar assembly is withdrawn and the drill is retracted as shown in FIG. 5*e***.

What we claim as our invention is:

1. A method of drilling and injecting preservative fluid into a railway tie, the method comprising the steps of initially drilling a hole in the tie with a suitable fluted drill of the kind incorporating an internal, longitudinal fluid flow passage opening adjacent the drill tip, by rotating the drill in the drilling direction and simultaneously axially feeding the drill into the drilled hole, reversing the direction of drill rotation and simultaneously withdrawing the drill to clear the drilled hole of shavings, returning the drill to the hole using drilling rotation, reversing the drill rotation and maintaining the drill fully in the hole, while injecting preservative fluid into the walls of the hole from said opening, sealing the mouth of the hole to prevent the egress of preservative therefrom, and subsequently withdrawing the drill from the hole.

* * * * *